(12) United States Patent
Dale et al.

(10) Patent No.: US 8,940,460 B2
(45) Date of Patent: Jan. 27, 2015

(54) CATALYST INK PREPARATION FOR FUEL CELL ELECTRODE FABRICATION

(75) Inventors: Nilesh Dale, Farmington Hills, MI (US); Gregory DiLeo, Ann Arbor, MI (US); Taehee Han, Farmington Hills, MI (US); Kevork Adjemian, Birmingham, MI (US)

(73) Assignee: Nissan North America, Inc., Franklin, TN (US)

( * ) Notice: Subject to any disclaimer, the term of this patent is extended or adjusted under 35 U.S.C. 154(b) by 755 days.

(21) Appl. No.: 13/026,646

(22) Filed: Feb. 14, 2011

(65) Prior Publication Data

US 2012/0208106 A1 Aug. 16, 2012

(51) Int. Cl.
*H01M 4/02* (2006.01)
*H01M 4/88* (2006.01)
*H01M 4/92* (2006.01)
*H01M 8/10* (2006.01)

(52) U.S. Cl.
CPC ............ *H01M 4/886* (2013.01); *H01M 4/8807* (2013.01); *H01M 4/8832* (2013.01); *H01M 4/926* (2013.01); *H01M 8/1023* (2013.01); *H01M 8/1039* (2013.01); *H01M 8/106* (2013.01); *Y02E 60/50* (2013.01)
USPC ....................................................... 429/534

(58) Field of Classification Search
USPC ....................................................... 429/534
See application file for complete search history.

(56) References Cited

U.S. PATENT DOCUMENTS

| 4,876,115 A | 10/1989 | Raistrick |
| 5,783,325 A | 7/1998 | Cabasso et al. |
| 5,882,810 A | 3/1999 | Mussell et al. |

(Continued)

FOREIGN PATENT DOCUMENTS

WO 2007/108950 A2 9/2007

OTHER PUBLICATIONS

Elsevier, Journal of Power Sources 106 (2002) 146-152; "Effect of the catalytic ink preparation method on the performance of polymer electrolyte membrane fuel cells" by S.-J. Shin(a), J.-K. Lee(b), H.-Y. Ha(a), S.-A. Hong(a), H.-S. Chun(b), I.-H. Oh(a); (a) Fuel Cell Research Center, Korea Institute of Science and Technology, Seoul 136-791, South Korea; (b) Department of Chemical Engineering, Korea University, Seoul 136-701, South Korea.

(Continued)

*Primary Examiner* — Ula C. Ruddock
*Assistant Examiner* — Jacob Marks
(74) *Attorney, Agent, or Firm* — Young, Basile, Hanlon & MacFarlane, P.C.

(57) ABSTRACT

Methods of fabricating gas diffusion electrodes and gas diffusion electrodes made from such methods are disclosed herein. One method of fabricating a gas diffusion electrode for a fuel cell comprises preparing a catalyst ink of a predetermined viscosity. Preparing the catalyst ink comprises mixing a catalyst solution comprising catalyst particles, an ionomer and a solvent at a first speed for a first period of time and homogenizing the catalyst solution at a second speed in a temperature controlled environment for a second period of time, wherein the second period of time is longer than the first period of time, the second period of time and the second speed selected to preserve a structure of the catalyst particles during homogenization. An active electrode layer is formed by spraying the catalyst ink directly on a gas diffusion layer in a single application and a uniform loading.

18 Claims, 2 Drawing Sheets

(56) References Cited

U.S. PATENT DOCUMENTS

| | | |
|---|---|---|
| 2003/0086862 A1 | 5/2003 | Tsou et al. |
| 2004/0141908 A1 | 7/2004 | Hara et al. |
| 2007/0184336 A1* | 8/2007 | Kim et al. .................. 429/44 |
| 2007/0212593 A1 | 9/2007 | Raiford et al. |
| 2008/0070083 A1 | 3/2008 | Markoski et al. |
| 2008/0241623 A1 | 10/2008 | Mossman et al. |
| 2008/0274393 A1 | 11/2008 | Markoski et al. |
| 2009/0053577 A1* | 2/2009 | Aotani .................... 429/33 |
| 2009/0074956 A1 | 3/2009 | Taylor |
| 2009/0162721 A1* | 6/2009 | Naohara et al. .............. 429/30 |
| 2009/0239117 A1* | 9/2009 | Yamagata ................. 429/30 |
| 2010/0143821 A1* | 6/2010 | McGrath et al. ............. 429/483 |
| 2010/0209806 A1 | 8/2010 | Cremers et al. |
| 2010/0304269 A1* | 12/2010 | Kim et al. ................ 429/483 |

OTHER PUBLICATIONS

Elsevier, Journal of Power Sources 157 (2006) 703-708; Received Oct. 14, 2005, accepted Nov. 1, 2005; Available Online Jan. 10, 2006; "Investigation of polyaniline impregnation on the performance of gas diffusion electrode (GDE) in PEMFC using binary of Nafion and polyaniline nanofiber" by Hussein Gharibi (a) (b), Mohammad Zhiani (a), Rasol Abdullah Mirzaie (c); Mehdi Kheirmand (a), Ali Akbar Entezami (d), Karim Kakaei (a), Masumeh Javaheri (a).

* cited by examiner

CATALYST INK PREPARATION FOR FUEL CELL ELECTRODE FABRICATION

TECHNICAL FIELD

The present invention relates in general to catalyst ink preparation for fuel cell gas diffusion electrode fabrication, and in particular to a catalyst ink for a spray system.

BACKGROUND

Gas diffusion electrodes are used in fuel cells, where oxidant and fuel react at the gas diffusion electrodes to form water and heat, while converting the chemical bond energy into electrical energy. Gas diffusion electrodes are fabricated by applying catalyst ink to gas diffusion layers. Applications can include brushing, decal transfer and spraying. Each has associated disadvantages. Because the application of the catalyst ink has a significant impact on the performance of the fuel cell, optimizing catalyst ink characteristics that improve application is of interest in the field.

SUMMARY

Methods of fabricating gas diffusion electrodes are disclosed herein. One method of fabricating a gas diffusion electrode for a fuel cell comprises preparing a catalyst ink of a predetermined viscosity. Preparing the catalyst ink comprises mixing a catalyst solution comprising catalyst particles, an ionomer and a solvent at a first speed for a first period of time and homogenizing the catalyst solution at a second speed in a temperature controlled environment for a second period of time, wherein the second period of time is longer than the first period of time, the second period of time and the second speed selected to preserve a structure of the catalyst particles during homogenization. An active electrode layer is formed by spraying the catalyst ink directly on a gas diffusion layer in a single application and a uniform loading.

Another method of fabricating gas diffusion electrodes comprises preparing a catalyst ink comprising wetting a catalyst solution comprising a catalyst, an ionomer and a solvent, wherein the catalyst comprises at least one noble metal supported on carbon, the ionomer is perfluorosulfonic acid and the solvent is deionized water and isopropanol, and homogenizing the catalyst solution at a first speed in a temperature controlled environment for a predetermined period of time. The catalyst ink is sprayed directly on a gas diffusion layer in a single application and with a uniform loading.

Also disclosed are embodiments of gas diffusion layers made by one of the methods disclosed herein. For example, a gas diffusion electrode for a fuel cell is prepared by a process comprising preparing a catalyst ink, which comprises mixing a catalyst solution comprising a catalyst, an ionomer and a solvent at a first speed for a first period of time, wherein the catalyst comprises noble metal particles on carbon support particles and homogenizing the catalyst solution at a second speed in a temperature controlled environment for a second period of time such that the noble metal particles remain attached to the carbon support particles, the catalyst and the ionomer being evenly distributed in the catalyst solution, wherein the second period of time is longer than the first period of time and the second speed is greater than the first speed. The catalyst ink is sprayed directly on a gas diffusion layer in a single application and in a uniform thickness. The sprayed gas diffusion layer is then dried.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
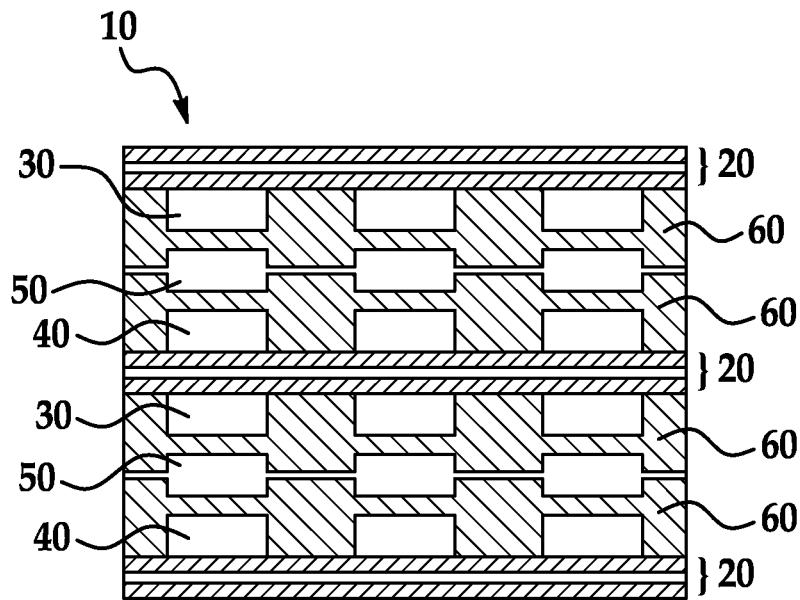
FIG. 1 is a schematic cross-sectional illustration of a basic fuel cell stack having multiple gas diffusion electrodes.

FIG. 1 shows a schematic cross-sectional illustration of a portion of a fuel cell stack 10. The illustration is provided as an example of the use of gas diffusion electrodes and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
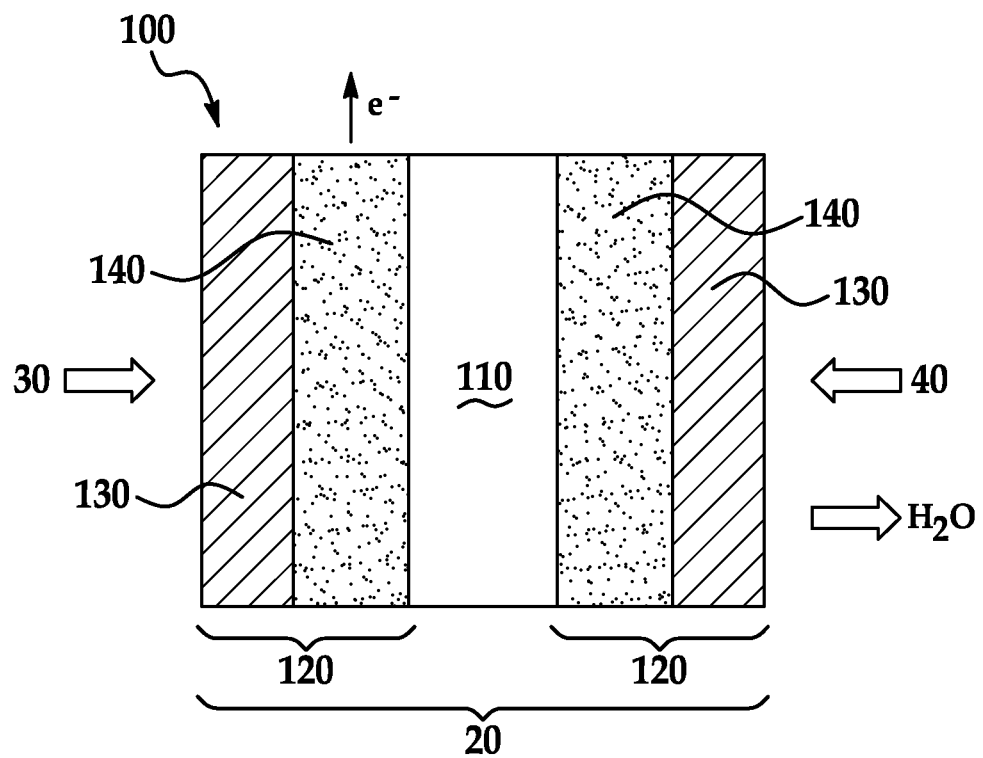
FIG. 2 is an enlarged schematic cross-sectional view of a membrane electrode assembly from the fuel cell stack of FIG. 1.

FIG. 2 is an illustration of one of the plurality of fuel cells 100 in the fuel cell stack 10. The fuel cell 100 is comprised of a single membrane electrode assembly 20. The membrane electrode assembly 20 has an electrolyte membrane 110 with a gas diffusion electrode 120 on opposing sides of the membrane 110. Each gas diffusion electrode 120 has a gas diffusion layer 130 on which a catalyst layer 140 is formed. When fuel 30, such as hydrogen gas, is introduced into the fuel cell 100, the catalyst layer 140 of the gas diffusion electrode 120 splits hydrogen gas molecules into protons and electrons. The protons pass through the membrane 110 to react with the oxidant 40, such as air, forming water ($H_2O$). The electrons ($e^-$), which cannot pass through the membrane 110, must travel around it, thus creating the source of electrical energy.

The gas diffusion layer 130 of the gas diffusion electrode 120 is typically a layer of light, mechanically stable support material such as macroporous carbon paper or cloth. The carbon paper can be coated with carbon black. The carbon black can be mixed with an organic binder before coating. The carbon material provides a gas diffusion layer 130 that is light weight with high open porosity. Other material can alternatively be used, such as materials in the form of nonwovens or other papers or woven cloth comprising glass fibers or fibers comprising organic polymers. The gas diffusion layer 130 serves as a current collector that allows ready access of fuel 30 and oxidant 40 to the anode and the cathode catalyst surfaces, respectively.

Figure 3:
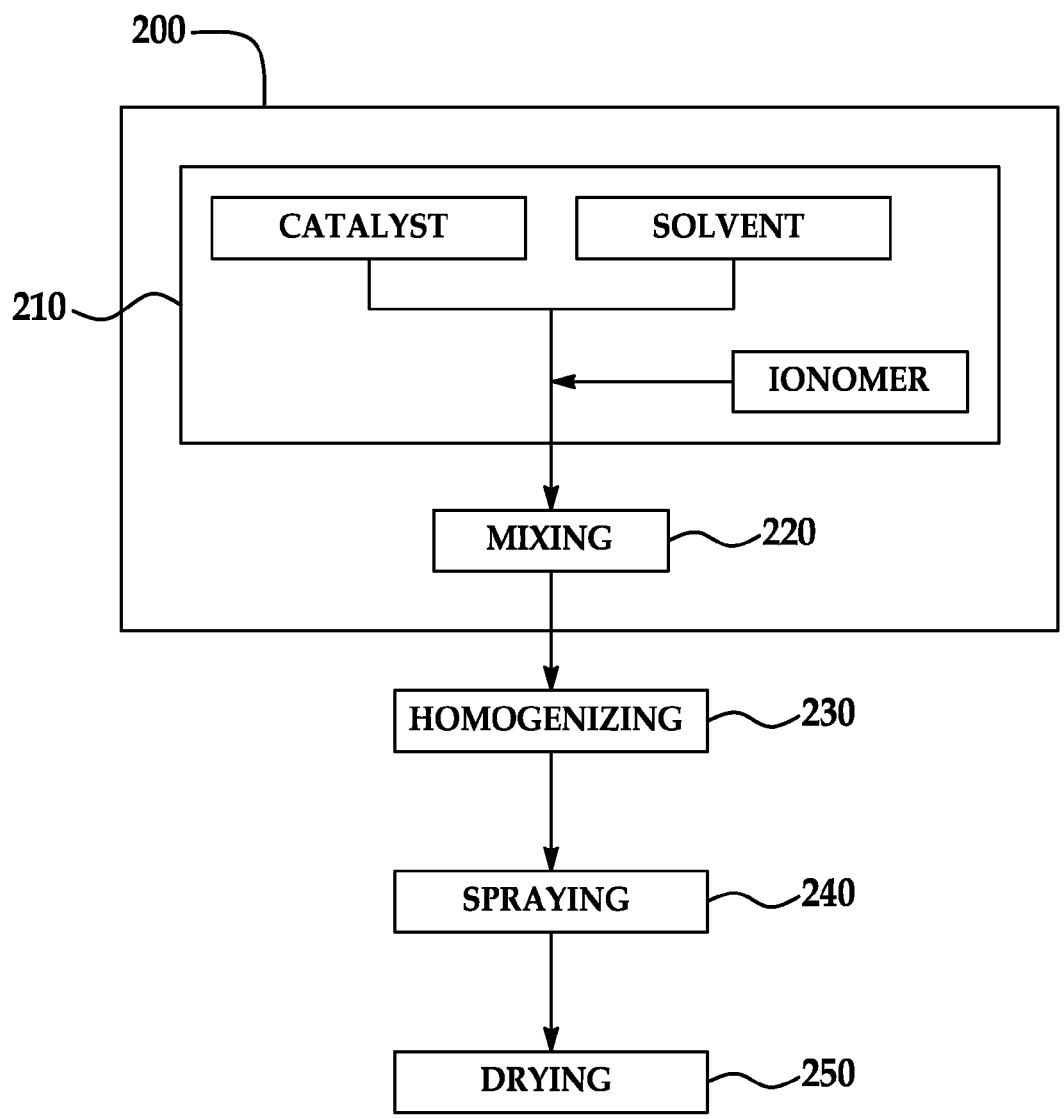
FIG. 3 is a flow diagram of one of the methods disclosed herein.

FIG. 3 is a flow diagram of a method of fabricating a gas diffusion electrode 120 for use in a fuel cell 100. The first step 200 is to prepare a catalyst ink that forms the catalyst layer 140 of the gas diffusion electrode 120. The preparation of catalyst ink 200 begins with step 210, preparing a catalyst solution comprising catalyst particles, an ionomer and a solvent.

The catalyst particles used in the catalyst solution are an electrically conductive material, typically in powder form, which can comprise, for example, carbon as a support structure supporting a metal which is insoluble or only very slightly soluble in water with low oxidation sensitivity. Non-limiting examples of such a metal include titanium, gold, platinum, palladium, silver and nickel and mixtures thereof.

One non-limiting example of a catalyst powder used herein comprises platinum particles supported on carbon. The carbon support of the catalyst is electrically conductive and porous, so that sufficient conductivity and gas-permeability of the catalytic layer is ensured. Carbon minimizes electronic resistance of the electrode while platinum serves as the catalyst for the electrochemical reaction.

The ionomer included in the catalyst solution is a proton-conducting polymer that can simultaneously serve as a binder for the catalyst layer 140. The ionomer can be a high molecular weight material capable of conducting hydrogen ions, such as perfluorosulfonic acid and non-fluorinated acidified hydrocarbon ionomers. The ionomer enables protons to be conducted between catalytic sites. The ionomer can be added to the solution in a ratio of ionomer to carbon in a carbon containing catalyst of about 0.9/1.0.

The solvent improves the ability to prepare the solution as it improves the wettability of the electrically conductive catalyst particles, thus making them more miscible. Typical solvents are, as non-limiting examples, deionized water and alcohols, such as isopropanol and ethanol. More than one type of solvent can be used.

The next step in the preparation 200 of the catalyst ink is the mixing step 220. This mixing step 220 is performed at a first speed and for a first period of time sufficient to wet the catalyst particles, or reduce the surface tension. The mixing step 220 can be performed at fairly low rpms, such as those achieved with a stir bar mixer or by hand with a stirring rod. For example, rpms of around 700 to 900 would be typical. Both the means of mixing and the speed are provided by means of example and are not meant to be limiting. Other means of mixing and other speeds can be used by those skilled in the art to achieve sufficient wetting of the catalyst solution.

It has been found that catalyst particles including carbon when mixed with water as the solvent having a ratio of water to carbon in a range of 25/1 to 30/1 achieved proper wetting in the mixing step 220. When the solvent comprises isopropanol, the catalyst solution having a ratio of isopropanol to carbon in a range of 12/1 to 13/1 achieves the desired wetting in the mixing step 220.

The preparation step 200 can be performed in a glove box or similar controlled environment to prevent ignition of the platinum when mixed with the solvent.

After the catalyst solution is properly wetted by the mixing step 220, the catalyst ink is homogenized in step 230 in a temperature controlled environment. The homogenization step 230 occurs at a predetermined second speed and for a predetermined second period of time such that the catalyst ink is homogenized while the integrity of the catalyst structure and the ionomer is maintained. The second period of time is longer than the first period of time, and can typically be about three hours. This is provided by means of example, and other time periods can be utilized that achieve the desired outcome. The second speed is also greater than the first speed used in mixing step 220. For example, the second speed can be about 10,000 rpms.

Proper homogenization in step 230 can increase gas channels and provide for high utilization of platinum, both of which provide for a high-performance gas diffusion electrode 120. To achieve proper homogenization in step 230, any homogenizer known to those skilled in the art can be used provided the appropriate homogenization of the catalyst ink can be achieved. However, it has been found that the use of ultrasonic mixing has a deleterious effect on the catalyst solution.

Preserving the catalyst structure and ionomer chains during the homogenization step 230 is important to the performance of the gas diffusion electrode 120. If the homogenization step 230 occurs at a speed less than the predetermined speed, the catalyst solution will not be properly homogenized. This can result in, for example, decreased fuel cell efficiency due to localized areas where the catalyst particles and ionomer are not evenly dispersed on the gas diffusion layer 130. If the ionomer is not properly dispersed, protons will not be conducted properly between catalytic active sites. If catalyst is not properly dispersed, the active sites may be clumped together so that they are not available to the protons. These localized reductions of gas channels or available active sites can inhibit the electrochemical reaction.

The supporting material of the catalyst spreads the metal, such as platinum, evenly over its surface to maximize the surface area of the metal with which the metal can react with the fuel. If the homogenization step 230 occurs at a speed greater than the predetermined speed, the structure of the catalyst can degrade. For example, the platinum particles that are supported in the interstitial spaces of the carbon support can be dislodged from the support, preventing even dispersion or access to the active sites. The ionomer can also be degraded if the homogenization step 230 occurs at a speed greater than the predetermined speed. The ionomer chains can be sheared or broken during mixing. This shearing of the ionomer can inhibit the conduction of protons to active catalyst sites. Each will reduce the efficiency of the fuel cell.

The homogenizing step 230 can be performed in a temperature controlled environment to reduce or eliminate the temperature rise observed during homogenizing. Reducing or eliminating the temperature rise contributes to maintaining the integrity of the materials. As a non-limiting example, the temperature controlled environment can be a water bath. Other similar means of controlling temperature known to those skilled in the art can be employed.

The catalyst ink can be in a sealed container during the homogenizing step 230 to prevent evaporation of the solvent. If the solvent evaporates, the viscosity of the catalyst ink can be negatively affected. Preventing evaporation contributes to achieving the desired viscosity of the homogenized catalyst ink.

Once the catalyst ink has been homogenized in step 230, an active electrode layer or catalyst layer 140 is formed on the gas diffusion layer 130 in step 240 by spraying the catalyst ink directly on the gas diffusion layer 130 in a single application. The single spray application achieves the desired or required catalyst loading uniformly across the gas diffusion layer 130. To achieve the appropriate loading and uniformity of the homogenized catalyst ink, viscosity of the catalyst ink resulting from steps 210-230 is such that the ink is sprayable with the pressure, speed and nozzle size of the spray device. The ability to achieve a uniform layer of catalyst resulting in a uniform loading of the desired or required amount of active catalyst material in a single spray has many advantages, including reduction in time, reduction in amount of overspray, reduction in catalyst costs, and others. Due to the high cost of platinum, a metal typically used in gas diffusion electrodes, any reduction in platinum in the fabrication of the electrodes is advantageous.

The gas diffusion electrode 120 produced in this way is subsequently dried in step 250. The temperatures required for drying depend on the type of solvents used, as well as the type of gas diffusion layer 130 and ionomer used. In general, drying occurs at temperatures above room temperature and for a predetermined period of time. For example, drying can occur in an oven in either air or inert gas at temperatures ranging from about 75° C. to about 85° C. The predetermined period of time can be between twenty and thirty minutes, as a non-limiting example.

As illustrated in FIGS. 1 and 2, the gas diffusion electrode 120 made by the process in FIG. 3 is applied to the electrolyte membrane 110. One gas diffusion electrode 120 is applied to opposing sides of the membrane 110 to form the membrane electrode assembly 20. The catalyst layer 140 of the gas diffusion electrode 120 on the fuel 30 side of the membrane 110 is the anode and the catalyst layer 140 on the oxidant 40 side of the membrane 110 is the cathode. The gas diffusion electrodes 120 are applied to the membrane 110 with the catalyst layer 140 contacting the membrane 110. The catalyst layers 140 between the gas diffusion layers 130 and the membrane 110 can be made with the same catalyst ink as shown herein. Alternatively, the catalyst layers 140 can have different catalyst ink compositions such that the anode and cathode are different.

The membrane 110 can include, as a non-limiting example, polytetrafluoroethylene (PTFE) for support as PTFE has high thermal stability and high resistance to chemical degradation. The membrane 110 also includes, as a non-limiting example, perfluorosulfonie acid (PSFA) or other sulfonic acid to conduct the protons. The gas diffusion electrodes 120 can be applied to the membrane 110 by hot pressing, as a non-limiting example.

As an example, gas diffusion electrodes 120 were made with the following method. Catalyst solution of 46.44 grams is prepared in a glove box by adding 28.5 grams of deionized water, 12.11 grams of isopropanol and 4.07 grams of 20 wt % perfluorosulfonic acid ionomer to 45-47 wt % platinum on carbon catalyst powder. The ratio of water to carbon is maintained between 25/1 and 30/1. The ratio of isopropanol to carbon is maintained at 12.75 to 1. The ratio of ionomer to carbon is maintained at about 0.9 to 1.0. The catalyst solution is mixed using a magnetic stir bar for about five minutes. The catalyst solution is then placed under a homogenizer and mixed for three hours in a water bath to produce the catalyst ink. The catalyst solution is sealed during homogenizing to prevent evaporation so that viscosity is maintained during homogenization.

The catalyst ink is then sprayed on the gas diffusion layer and dried in an oven at 80° C. for about twenty-five minutes. Parameters for spraying include a fluid pressure of about 2.4 psi, air pressure of about 5 psi and a 24 gauge spray nozzle with an opening of 0.25 mm. The resulting gas diffusion electrode has the desired catalyst loading of 0.35 mg platinum/$cm^2$ with uniform thickness.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of fabricating a gas diffusion electrode for a fuel cell comprising:
    preparing a catalyst ink of a predetermined viscosity comprising:
        mixing a catalyst solution comprising catalyst particles, an ionomer and a solvent at a mixing speed for a first period of time; and
        homogenizing the catalyst solution at a homogenizing speed in a temperature controlled environment for a second period of time, wherein the second period of time is longer than the first period of time, the second period of time being greater than ten times as long as the first period of time and the homogenizing speed being greater than ten times the mixing speed; and
    forming an active electrode layer by spraying the catalyst ink directly on a gas diffusion layer in a single application and a uniform loading.

2. The method of claim 1, further comprising:
    drying the sprayed gas diffusion layer in an oven for a third period of time.

3. The method of claim 2, wherein drying is performed between 75° C. and 85° C. and the third period of time is between twenty and thirty minutes.

4. The method of claim 1, wherein the second period of time is about three hours.

5. The method of claim 1, wherein the homogenizing speed is about 10,000 RPM.

6. The method of claim 1, wherein the catalyst particles include carbon and the catalyst solution has a ratio of ionomer to carbon of about 0.9/1.0 by weight.

7. The method of claim 1, wherein the catalyst particles include carbon and the solvent comprises water, with the catalyst solution having a ratio of water to carbon in a range of 25/1 to 30/1 by weight.

8. The method of claim 1, wherein the catalyst particles include carbon and the solvent comprises isopropanol, with the catalyst solution having a ratio of isopropanol to carbon in a range of 12/1 to 13/1 by weight.

9. The method of claim 1, wherein the catalyst particles comprise platinum particles supported on carbon particles.

10. The method of claim 1, wherein the ionomer is a perfluorosulfonic acid.

11. The method of claim 1, wherein the solvent is deionized water and isopropanol.

12. The method of claim 1, wherein the temperature controlled environment is a water bath.

13. The method of claim 1, wherein the catalyst particles comprise platinum, the ionomer is a perfluorosulfonic acid and the solvent is deionized water and propanol.

14. The method of claim 13, wherein the uniform loading is about 0.35 mg platinum/$cm^2$ with a uniform thickness.

15. A method of fabricating a gas diffusion electrode for a fuel cell comprising:
    preparing a catalyst ink of a predetermined viscosity comprising:
        wetting a catalyst solution comprising a catalyst, an ionomer and a solvent, wherein the catalyst comprises at least one noble metal supported on carbon, the ionomer is perfluorosulfonic acid and the solvent is deionized water and isopropanol; and
        homogenizing the catalyst solution at a homogenizing speed in a temperature controlled environment for a predetermined period of time that is greater than 2 hours; and
    spraying the catalyst ink directly on a gas diffusion layer in a single application and with a uniform loading.

16. The method of claim 15, wherein the predetermined period of time is about three hours.

17. The method of claim 15, wherein the homogenizing speed is about 10,000 RPM.

18. The method of claim 15, wherein wetting comprises mixing the catalyst solution at a mixing speed lower than the homogenizing speed, the homogenizing speed being greater than 10 times the mixing speed.

* * * * *